United States Patent
Fujimoto (10) Patent No.: US 6,758,779 B2
(45) Date of Patent: Jul. 6, 2004

(54) POWER TRANSMISSION BELT AND PROCESS FOR PRODUCTION OF THE SAME

(75) Inventor: Hiroshi Fujimoto, Kobe (JP)

(73) Assignee: Bando Chemical Industries Ltd., Hyogo (JP)

(*) Notice: Subject to any disclaimer, the term of this patent is extended or adjusted under 35 U.S.C. 154(b) by 150 days.

(21) Appl. No.: 10/214,657

(22) Filed: Aug. 7, 2002

(65) Prior Publication Data

US 2003/0087715 A1 May 8, 2003

(30) Foreign Application Priority Data

Aug. 13, 2001 (JP) ........................................ 2001-245471

(51) Int. Cl.[7] .................................................. F16G 1/00
(52) U.S. Cl. ........................................ 474/260; 474/263
(58) Field of Search ................................ 474/260, 263, 474/264, 267, 268, 271

(56) References Cited

U.S. PATENT DOCUMENTS

| | | | | |
|---|---|---|---|---|
| 5,223,311 A | * | 6/1993 | Tsutsumi et al. | 427/388.1 |
| 5,322,479 A | * | 6/1994 | Le Devehat | 474/101 |
| 5,610,217 A | * | 3/1997 | Yarnell et al. | 524/397 |
| 5,986,029 A | * | 11/1999 | van Beek et al. | 526/160 |
| 6,132,328 A | * | 10/2000 | Kinoshita et al. | 474/260 |
| 6,358,170 B1 | * | 3/2002 | Fujiwara | 474/264 |
| 2001/0044353 A1 | * | 11/2001 | Nosaka et al. | 474/260 |

* cited by examiner

*Primary Examiner*—Thomas R. Hannon
(74) *Attorney, Agent, or Firm*—Merchant & Gould P.C.

(57) ABSTRACT

There is provided a power transmission belt which comprises a compression layer and an adhesive rubber layer which are adhered to each other by vulcanizing together and which has aramid fiber cords embedded in the adhesive rubber layer, wherein the compression layer and the adhesive rubber layer are formed of vulcanizate of an ethylene-α-olefin-diene rubber compound and wherein the aramid fiber cords having a first twisting coefficient and a final twisting coefficient both in the range from 650 to 950 are adhesion treated with a resorcin-formalin-latex adhesive composition wherein the latex comprises at least one of chlorosulfonated polyethylene and alkylated chlorosulfonated polyethylene in an amount of 50–100% by weight based on the solid components of the resorcin-formalin-latex and adhered to and embedded in the adhesive rubber layer. A process for the production of such power transmission belt is also provided.

12 Claims, 2 Drawing Sheets

POWER TRANSMISSION BELT AND PROCESS FOR PRODUCTION OF THE SAME

BACKGROUND OF THE INVENTION

1. Field of the Invention

This invention relates to a power transmission belt. More particularly, the invention relates to a power transmission belt which comprises a compression layer and an adhesive rubber layer both of which are formed of a vulcanizate of an ethylene-α-olefin-diene rubber compound and which has a plurality of load carrying cords formed of aramid fibers (which are referred to as "aramid fiber cords" hereunder) embedded in the adhesive rubber layer, and which is excellent both in durability and strength. The invention further relates to a process for the production of such a power transmission belt.

2. Description of the Prior Art

In general, a power transmission belt comprises a compression layer and an adhesive rubber layer, and a plurality of load carrying cords, i.e., fiber cords, are adhered to and embedded in the adhesive rubber layer. Optionally, the belt has a rubberized canvas or reinforcing fabric on the upper face or the inner face or on the whole surfaces including the side faces.

For the production of a power transmission belt, in particular, a compression layer of the belt, chloroprene rubber or a mixture of hydrogenated nitrile rubber and chlorosulfonated polyethylene rubber has been used heretofore. However, in recent years, an attempt has been made to use ethylene-α-olefin-diene rubber for the production of an adhesive rubber layer as well as a compression layer to meet a demand of "chlorine free" products from the standpoint of environmental protection.

However, as known in the art, ethylene-α-olefin-diene rubber has a defect that it is inferior in dynamic properties, in particular, in resistance to fatigue and wear, tensile strength and elasticity. In addition, it has poor adhesion to load carrying cords of aramid fibers. Such being the case, it has been considered difficult to use ethylene-α-olefin-diene rubber to produce power transmission belts in which dynamic properties are important requisites.

SUMMARY OF THE INVENTION

The present inventors have made intensive investigation to realize a power transmission belt which is excellent both in durability, i.e., dynamic life, and strength and which comprises a compression layer and an adhesive rubber layer both of which are formed of ethylene-α-olefin-diene rubber compound and which has a plurality of load carrying cords formed of aramid fibers bonded to and embedded in the adhesive rubber layer. As results, the inventors have found that the treatment of the aramid fiber cords having a first twisting coefficient and a final twisting coefficient both in the range of from 650 to 950 with a resorcin-formalin-latex adhesive composition wherein the latex in the composition contains at least one of a chlorosulfonated polyethylene and an alkylated chlorosulfonated polyethylene therein as solid components (rubber components) provides excellent dynamic adhesion between the aramid fiber cords and the adhesive rubber layer.

Thus, they have obtained a power transmission belt which is excellent both in dynamic properties and strength and which comprises a compression layer and an adhesive rubber layer both of which are formed of ethylene-α-olefin-diene rubber compound and which has a plurality of aramid fiber cords bonded to and embedded in the adhesive rubber layer. In this manner, they have completed this invention.

The inventors have further found that use of resorcin-formalin-latex adhesive composition which contains a specific metal oxide and a sulfur containing vulcanization accelerator for treatment of the aramid fiber cords further improves dynamic adhesion between the aramid fiber cords and the adhesive rubber layer even if the aramid fiber cords are dipped in the adhesive composition and dried at a temperature as high as 210° C. or more, and that they accordingly can manufacture power transmission belts formed of ethylene-α-olefin-diene rubber and having aramid fiber cords embedded therein in a very high productivity.

The invention has been completed to solve the above-mentioned problems in the known power transmission belts formed of ethylene-α-olefin-diene rubber. Accordingly, it is an object of the invention to provide a power transmission belt which comprises a compression layer and an adhesive rubber layer which are formed of ethylene-α-olefin-diene rubber and adhered to each other by vulcanizing together and, which comprises aramid fiber cords adhered to and embedded in the adhesive rubber layer, and which is excellent both in durability and strength.

It is a further object of the invention to provide a process for the production of a power transmission belt as mentioned above.

The invention provides a power transmission belt which comprises a compression layer and an adhesive rubber layer which are adhered to each other by vulcanizing together and which has a plurality of aramid fiber cords having a first twisting coefficient and a final twisting coefficient both in the range of from 650 to 950 and embedded in the adhesive rubber layer, wherein the compression layer and the adhesive rubber layer are formed of vulcanizate of an ethylene-α-olefin-diene rubber compound and wherein the aramid fiber cords are adhesion treated with a resorcin-formalin-latex adhesive composition wherein the latex contains at least one of chlorosulfonated polyethylene and alkylated chlorosulfonated polyethylene in an amount of 50–100% by weight based on the solid components (rubber components) of the latex, and adhered to and embedded in the adhesive rubber layer.

The invention further provides a process for production of a power transmission belt which comprises a compression layer and an adhesive rubber layer which are adhered to each other by vulcanizing together and which has aramid fiber cords embedded in the adhesive rubber layer, which comprises:

carrying out adhesion treatment of the aramid fiber cords having a first twisting coefficient and a final twisting coefficient both in the range of from 650 to 950, wherein the adhesion treatment comprises impregnating the aramid fiber cords with a resorcin-formalin-latex adhesive composition wherein the latex contains at least one of chlorosulfonated polyethylene and alkylated chlorosulfonated polyethylene in an amount of 50–100% by weight based on the solid components of the latex as well as at least one metal oxides and at least one sulfur containing vulcanization accelerators, and heating and drying the resulting aramid fiber cords at a temperature of 210–260° C.;

placing the resulting aramid fiber cords between a pair of sheets formed of unvalcanized ethylene-α-olefin-diene rubber compound which is to form an adhesive rubber layer;

laminating the said pair of sheets formed of unvalcanized ethylene-α-olefin-diene rubber compound on a sheet formed of unvalcanized ethylene-α-olefin-diene rubber compound which is to form a compression layer; and heating the resulting laminate under pressure to vulcanize the laminate in a body to provide the belt wherein the aramid fiber cords are adhered to and embedded in the adhesive rubber layer.

DESCRIPTION OF PREFERRED EMBODIMENTS OF THE INVENTION

The power transmission belt includes V-ribbed belts and V-belts herein the specification.

Figure 1:
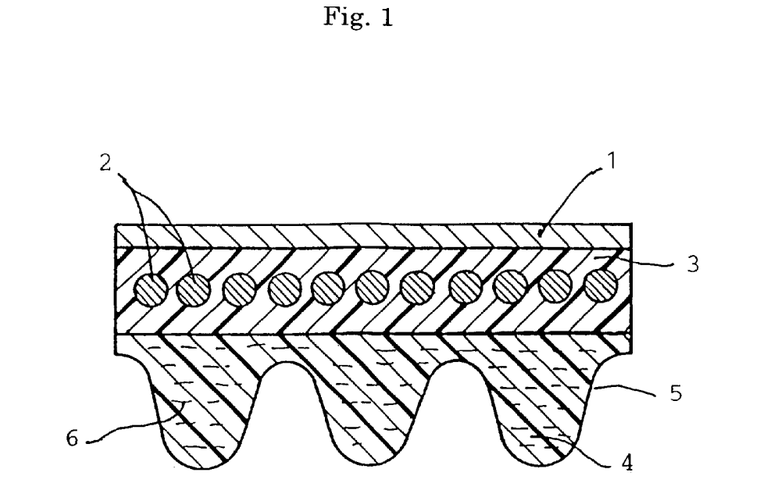
FIG. 1 shows a cross section of an example of a V-ribbed belt.

FIG. 1 shows a cross section of an example of a V-ribbed belt. The belt has an upper face covered with one or more sheets of rubberized reinforcing fabric or canvas 1. In adjacent to the upper face, the belt has an adhesive rubber layer 3 in which a plurality of aramid fiber cords 2 of low elongation are embedded, laterally apart from each other and extending in the longitudinal direction of the belt. In turn, a compression layer 5 that has a plurality of ribs 4 is laminated on the adhesive rubber layer. The ribs are laterally apart from each other and extend in the longitudinal direction of the belt. In many cases, the compression layer has short fibers dispersed therein which are oriented along the width direction of the belt so that the belt has improved resistance to lateral pressure.

Figure 2:
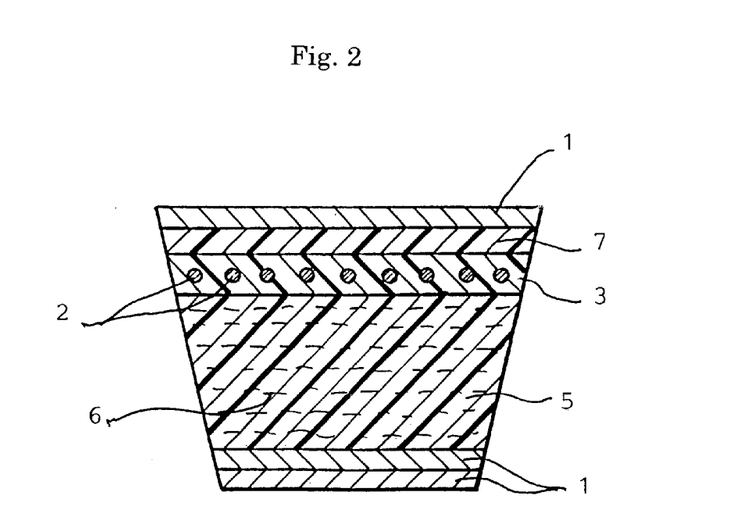
FIG. 2 shows a cross section of an example of a V-belt.

FIG. 2 shows a cross section of an example of a V belt. In the same manner as above, the belt has an upper face covered with one or more sheets of rubberized reinforcing fabric or canvas 1. Optionally, the belt has a tension layer 7 under the reinforcing fabric laminated thereto. In adjacent to the tension layer, the belt has an adhesive rubber layer 3 in which a plurality of aramid fiber cords 2 of low elongation are embedded. In turn, a compression layer 5 is laminated on the adhesive rubber layer. In many cases, the compression layer has short fibers dispersed therein which are oriented along the width direction of the belt so that the belt has improved resistance to lateral pressure. The compression layer is usually covered with one or more sheets of rubberized reinforcing fabric or canvas 1.

In the power transmission belt of the invention, the compression layer and the adhesive rubber layer are vulcanized together and adhered to each other and the aramid fiber cords are adhered to and embedded in the adhesive rubber layer. If necessary, the upper face or the inner face or the whole surfaces including the side faces have rubberized reinforcing fabric adhered thereto. The compression layer and the adhesive rubber layer are formed of vulcanizate of ethylene-α-olefin-diene rubber compound.

The ethylene-α-olefin-diene rubber used in the invention is a copolymer rubber formed of ethylene, an α-olefin except ethylene and a diene (non-conjugated diene), a partially halogen substituted product of the copolymer rubber or a mixture of these. The α-olefin is preferably at least one of propylene, butene, hexene and octene. Preferred ethylene-α-olefin-diene rubber used in the invention is ethylene-propylene-diene rubber or a partially halogen substituted product of the rubber, especially a partially chlorine substituted product of the rubber, or a mixture of these.

It is preferred that the ethylene-α-olefin-diene rubber used in the invention contains 50–80% by weight of ethylene, 50–20% by weight of propylene and a non-conjugated diene component in such an amount that the resultant rubber has an iodine value of not more than 50, preferably in the range of 4–40, and has a Mooney viscosity $ML_{1+4}$ (100° C.) of 20–120. The diene component includes non-conjugated dienes such as 1,4-hexadiene, dicyclopentadiene or ethylidene norbornene, although the diene component usable is not limited thereto.

Such an ethylene-α-olefin-diene rubber is usually mixed together with a reinforcing agent such as carbon black or silica, a vulcanizing agent such as sulfur, various kinds of vulcanization accelerators, vulcanization auxiliaries such as zinc oxide or stearic acid, or a softener (plasticizer) such as paraffin oil, a tackifier, or short fibers using a common mixing means such as rolls or Banbury mixers to form an unvulcanized rubber compound. The compound is then formed to a sheet for use as an unvulcanized rubber compound sheet to form an adhesion rubber layer or a compression rubber layer.

In addition to the above-mentioned components, the thus prepared ethylene-α-olefin-diene rubber compound may further contain, if necessary, a reinforcing agent such as glass fibers or ceramic fibers, or any other chemicals commonly used in the rubber industry such as a filler (e.g., calcium carbonate or talc), a stabilizer, a processing aid, or a coloring agent.

An adhesive solution (so-called rubber cement) described below is obtained usually by dissolving such an unvulcanized compound of ethylene-α-olefin-diene rubber in an organic solvent.

In the power transmission belt of the invention, aramid fiber cords are used as load carrying cords. As well known, the aramid fiber is formed of aromatic polyamide obtained by the reaction of an aromatic diamine (for example, phenylenediamine) with an aromatic dicarboxylic acid dichloride (for example, terephthaloyl chloride). The aramid fiber cords usable in the invention are not limited to specific ones, but for example, "Technola" T-200 available from Teijin K. K. is preferably used.

In particular, it is necessary according to the invention that the aramid fiber cord used has a first twisting coefficient and a final twisting coefficient both in the range of 650–950. The twisting coefficient K is expressed by an equation:

$$K = T\sqrt{D}$$

wherein T (1/10 cm) is a twisting number and D (de) is a total denier number. Usually an aramid fiber cord is produced that it has approximately equal first twisting coefficient and final twisting coefficient so that the resulting power transmission belt does not produce deviation or meandering when traveling.

When an aramid fiber cord has a first twisting coefficient and final a twisting coefficient both less than 650, the resulting belt is excellent in strength, but poor in durability. On the other hand, when an aramid fiber cord has a first twisting coefficient and a final twisting coefficient both more than 950, the resulting belt is insufficient in strength. According to the invention, a belt which is excellent both in strength and durability is obtained by using an aramid fiber which has a first twisting coefficient and a final a twisting coefficient both in the range of from 650 to 950.

Further according to the invention, such aramid fiber cords are adhesion treated with a resorcin-formalin-latex adhesive composition (which is referred to the "RFL adhesive composition") wherein the latex comprises at least one of chlorosulfonated polyethylene and alkylated chlorosulfonated polyethylene in an amount of 50–100% by weight based on the solid components (rubber components) of the latex and adhered to and embedded in the adhesive rubber layer.

The chlorosulfonated polyethylene rubber is a rubber obtained by the reaction of chlorine and sulfur dioxide with polyethylene and it has chlorosulfonyl groups as vulcanizing points. It contains chlorine usually in an amount of 15–45% by weight, preferably in an amount of 25–35% by weight, and sulfur usually in an amount of 0.5–2.5% by weight. The alkylated chlorosulfonated polyethylene is reduced in the amount of polar atoms or chlorine atoms and instead it has alkyl groups therein to decrease the crystallinity of molecules so that the rubber is balanced in low temperature properties (cold resistance) and elasticity. It contains chlorine usually in an amount of 25–35% by weight and sulfur usually in an amount of not more than 1% by weight, preferably in an amount of 0.6–0.8% by weight.

The RFL adhesive composition used in the invention is usually prepared by condensing resorcin (R) with formalin (F) in a resorcin/formalin molar ratio in the range from 1/3 to 3/1 in the presence of a basic catalyst to prepare an aqueous solution of resorcin-formalin resin (resorcin-formalin primary condensate, hereafter referred to the "RF resin") in a concentration of 5–80% by weight, and then mixing the solution with a latex (L). The solid content of RFL adhesive composition is usually in the range of 10–50% by weight.

According to the invention, the aramid fiber cords are adhesion treated with the RFL adhesive composition. The latex used in the RFL adhesive composition contains at least one of chlorosulfonated polyethylene and alkylated chlorosulfonated polyethylene in an amount of 50–100% by weight, preferably in an amount of 60–100% by weight, based on the solid components of the latex. The thus treated aramid fiber cords are then placed between a pair of sheets of unvulcanized ethylene-α-olefin-diene rubber compound which are to form an adhesive rubber layer. The sheets are then laminated to a sheet of unvulcanized ethylene-α-olefin-diene rubber compound which is to form a compression layer, heated under pressure and vulcanized together in a body to provide a power transmission belt of the invention.

In more detail, for example, the aramid fiber cords are dipped in the RFL adhesive composition and are then heated (i.e., baked) and dried at a temperature of 210–260%C, preferably at a temperature of 220–255° C., to fix the RFL adhesive composition on the aramid fiber cords. However, if necessary, the aramid fiber cords may be heated (i.e., baked) at a temperature of 150–200° C., preferably at a temperature of 170–200° C., after dipping in the RFL adhesive composition.

According to the invention, it is preferred that the aramid fiber cords are first dipped in a first RFL adhesive composition and heated and dried to effect the first RFL treatment, and are then dipped in a second RFL adhesive composition and heated and dried to effect the second (or final) RFL treatment. That is, it is preferred that the adhesion treatment of aramid fiber cords be carried out at least twice in this way. The first and second RFL adhesive compositions used may be the same or may not. If necessary, the treatment may be carried out three times or more.

As rubber components, in addition to at least one rubber selected from the group consisting of chlorosulfonated polyethylene and alkylated chlorosulfonated polyethylene, which is referred to a first rubber, the latex contained in the RFL adhesive composition used in the invention may contain a second rubber. The second rubber is preferably a copolymer rubber comprised of 2-chloro-1,3-butadiene and 2,3-dichloro-1,3-butadiene (DCB).

The use of RFL adhesive composition in which the latex contains a copolymer of 2-chloro-1,3-butadiene and 2,3-dichloro-1,3-butadiene (DCB) as the second rubber together with the first rubber therein forms much stronger adhesion between the RFL adhesive composition and the aramid fiber cords. Consequently, the resulting belt has a much extended dynamic life.

When the latex contains the second rubber as mentioned above, the latex contains the first rubber in an amount of not less than 50% by weight, preferably in an amount of 55–95% by weight, most preferably in an amount of 60–90% by weight, and the second rubber in an amount of not more than 50% by weight, preferably in an amount of 5–45% by weight, most preferably in an amount of 10–40% by weight.

In this way, according to the invention, the aramid fiber cords are adhesion treated with the RFL adhesive composition which contains a latex wherein at least one rubber selected from chlorosulfonated polyethylene and alkylated chlorosulfonated polyethylene is main rubber components, placed between a pair sheets formed of unvulcanized ethylene-α-olefin-diene rubber compound which are to form an adhesive rubber layer, and the pair of sheets of unvulcanized rubber compound are vulcanized together with the fiber cords to embed the fiber cords in the resultant vulcanized adhesive rubber layer. Thus, high dynamic adhesion is attained between the aramid fiber cords and the adhesive rubber layer. The belt of the invention has the aramid fiber cords vulcanized and adhered to the adhesive rubber layer in a body so that it has a much extended dynamic life.

According to the invention, it is further preferred that the RFL adhesive composition contain at least one specific metal oxides and at least one sulfur containing vulcanization accelerators. The dynamic adhesion between the aramid fiber cords and the adhesive rubber layer is further improved, but also the time required to carry out the adhesion treatment of the aramid fiber cords is remarkably reduced when the aramid fiber cords are dipped in the RFL adhesive composition containing at least one such metal oxides and at least one such sulfur containing vulcanization accelerators in addition the RF and the latex, and heated and dried at a temperature of not less than 210° C. Thus, the process of the invention enables to produce power transmission belts having aramid fiber cords embedded in the adhesive layer and having excellent dynamic adhesion in very high productivity.

The metal oxide used in the invention includes, for example, zinc oxide, magnesium oxide and lead oxide. The metal oxide is used alone or as a mixture of two or more of these. Among these, zinc oxide is preferred. In turn, the sulfur-containing vulcanization accelerator used in the invention includes, for example, thiazoles, sulfenamides (sulfenic acid amides), thiurams and dithiocarbamates. The sulfur-containing vulcanization accelerator is used alone or as a mixture of two or more of these. The sulfur containing vulcanization accelerator is more effective for acceleration of vulcanization of ethylene-α-olefin-diene rubber than for acceleration of vulcanization of chlorosulfonated polyethylene rubber or alkylated chlorosulfonated polyethylene rubber.

There may be mentioned as examples of the thiazoles, for example, 2-mercaptobenzothiazole (M) and their salts (such as zinc salt, sodium salt, cyclohexylamine salt) and dibenzothiazyl disulfide (DM), among others. There may be mentioned as examples of the sulfenamides, for example, N-cyclohexyl-2-benzothiazyl sulfenamide (CZ); and as thiurams, for example, tetramethylthiuram monosulfide (TS), tetramethylthiuram disulfide (TT) and dipentamethylene-thiuram tetrasulfide (TRA); as the dithiocarbamates, for example, sodium di-n-butyl dithiocarbamate (TP), zinc dimethyldithiocarbamate (PZ) and zinc diethyldithiocarbamate (EZ), among others.

The metal oxide is contained in the RFL adhesive composition usually in an amount of 0.1–10 parts by weight relative to 100 parts by weight of solid components in the RFL adhesive composition while the sulfur-containing vulcanization accelerator usually in an amount of 0.1–20 parts by weight relative to 100 parts by weight of solid components in the RFL adhesive composition.

As mentioned above, in accordance with the invention, the aramid fiber cords are impregnated with the RFL adhesive composition wherein the latex contains at least one of chlorosulfonated polyethylene and alkylated chlorosulfonated polyethylene in an amount of 50–100% by weight based on the solid component of the latex, as well as at least one specific metal oxides and at least one sulfur containing vulcanization accelerators, and then heated and dried at a temperature of 210–260° C., thereby achieving excellent dynamic adhesion between the aramid fiber cords and the adhesive rubber layer formed of ethylene-α-olefin-diene rubber, while securing high productivity.

According to the invention, the aramid fiber cords may be treated with isocyanate or epoxy compounds before they are treated with the RFL adhesive composition. That is, the aramid fiber cords may be pre-treated by dipping in a solution of isocyanate or epoxy compounds, and then, if necessary, heated and dried.

The isocyanate compound usable in the invention is not specifically limited. The isocyanate compound usable includes, for example, tolylene diisocyanate, m-phenylene diisocyanate, diphenylmethane diisocyanate, hexamethylene diisocyanate and polymethylene polyphenyl polyisocyanate. In addition, there are used as equivalents of polyisocyanates such products as obtained by the addition reaction of polyhydric alcohols that have two or more active hydrogen atoms in the molecule such as trimethylolpropane or pentaerythritol to the polyisocyanate compounds, or blocked polyisocyanate compounds obtained by the reaction of blocking agents such as phenols, tertiary alcohols or secondary amines with the polyisocyanate compounds are also used in the invention.

The epoxy compound usable in the invention is also not specifically limited so far as it has two or more epoxy groups in the molecule. Accordingly, there may be mentioned as such epoxy compounds, for example, reaction products of polyhydric alcohols such as ethylene glycol, glycerin, sorbitol or pentaerythritol or, polyalkylene glycols such as polyethylene glycol, with halogen-containing epoxy compounds such as epichlorohydrin. As further examples, there may be mentioned reaction products of polyfunctional phenols or phenol resins such as resorcin, bis(4-hydroxyphenyl) dimethylethane, phenol-formaldehyde resin, resorcin-formaldehyde resin with halogen-containing epoxy compounds such as epichlorohydrin.

The solvent to form solutions of the isocyanate or epoxy compounds is not specifically limited either, but water or organic solvents are used depending on the isocyanate or epoxy compounds used. Usually the isocyanate compounds are chemically so active that nonaqueous solutions are preferred. However, as mentioned above, such isocyanate compounds as blocked with, for example phenols, are stable in water so that aqueous solutions thereof may be used. As the organic solvent, aromatic hydrocarbons such as benzene, xylene or toluene, aliphatic ketones such as methyl ethyl ketone or methyl isobutyl ketone, aliphatic carboxylic acid alkyl esters such as ethyl acetate or amyl acetate may be used. The concentration of the solution of isocyanate or epoxy compound is usually in the range of 5–50% by weight.

Further according to the invention, the aramid fiber cords may be post-treated with rubber cement after they are adhesion treated with the RFL adhesive composition. The rubber cement used in the post-treatment is prepared by dissolving the same ethylene-α-olefin-diene rubber as used to form a compression layer or an adhesion rubber layer in an organic solvent to prepare a solution. In the post-treatment, the aramid fiber cords are dipped in the solution and heated and dried.

The power transmission belt of the invention is manufactured by processes commonly known in the art. By way of example, V-ribbed belt is manufactured as follows. One or more sheets of rubberized canvas and a first unvulcanized rubber sheet which is to form an adhesive rubber layer are wound on the smooth surface of a molding cylinder, and then the aramid fiber cords are wound spirally thereon. A second unvulcanized rubber sheet which is to form an adhesive rubber layer is further wound on the first rubber sheet to interpose the aramid fiber cords between the pair of sheets of unvulcanized rubber compound which are to form an adhesive rubber layer together. An unvulcanized rubber sheet which is to form a compression rubber layer is then wound on the second unvulcanized rubber sheet, thereby preparing a laminate.

The laminate is then heated under pressure in a vulcanizing vessel to effect vulcanization of the rubber sheets to provide a vulcanized annular product. The annular product is installed on a first belt driving system comprised of a driving roll and a driven roll and is driven to run under a predetermined tension while a plurality of ribs are formed on the surface of the laminate by using a suitable grinding wheel. The annular product having the ribs thereon is then installed on a second belt driving system and is driven to run while it is cut in annular slices having a predetermined width thereby providing V-ribbed belts.

As described above, the power transmission belt of the invention comprises a compression layer and an adhesive rubber layer both of which are formed of ethylene-α-olefin-diene rubber compound and which are adhered to each other by vulcanizing together and which has aramid fiber cords adhered to and embedded in the adhesive rubber layer. As a feature of the invention, the aramid fiber cords having a first twisting coefficient and a final coefficient both in the range of from 650 to 950 are adhesion treated with a resorcin-formalin-latex (RFL) adhesive composition wherein the latex contains at least one of chlorosulfonated polyethylene and alkylated chlorosulfonated polyethylene in an amount of 50–100% by weight based on the solid components of the latex, and adhered to and embedded in the adhesive rubber layer. Thus, improved dynamic adhesion is realized between the aramid fiber cords and the adhesive rubber layer and hence the resulting belt has improved dynamic life.

Further according to the invention, the dynamic adhesion between the aramid fiber cords and the adhesive rubber layer is further improved when the aramid fiber cords are impregnated with a resorcin-formalin-latex (RFL) adhesive composition which contains at least one specific metal oxides and at least one sulfur containing vulcanization accelerators and heated (baked) and dried at a temperature of 210–260° C. Thus, the process of the invention enables highly efficient production of a high performance power transmission belt which has aramid fiber cords embedded therein.

EXAMPLES

The invention will be described in more detail with reference to examples below, but the invention is not limited thereto.

A rubber compound having the following composition of which amounts are indicated by parts by weight was used as a compound to prepare an adhesive rubber layer of belt.

| | |
|---|---|
| Ethylene-propylene-diene rubber[1] | 100 parts |
| HAF carbon (Mitsubishi Kagaku K.K.) | 50 parts |
| Silica (Tokuseal Gu, Tokuyama K.K.) | 20 parts |
| Paraffin oil (Sunflex 2280, Japan Sun Kagaku K.K.) | 20 parts |
| Vulcanizing agent (oil sulfur, Hosoi Kagaku K.K.) | 3 parts |
| Vulcanizing accelerator (DM, Ouchi Shinko Kagaku K.K.) | 1.4 parts |
| Vulcanizing accelerator (EZ, Ouchi Shinko Kagaku K.K.) | 0.6 parts |
| Vulcanizing accelerator (TT, Ouchi Shinko Kagaku K.K.) | 0.6 parts |
| Accelerator activator (stearic acid, Kao K.K.) | 1 part |
| Accelerator activator (zinc oxide, Sakai Kagaku Kogyo K.K.) | 5 parts |
| Antioxidant (224[2], Ouchi Shinko Kagaku K.K.) | 2 parts |
| Antioxidant (MB[3], Ouchi Shinko Kagaku K.K.) | 1 part |
| Tackifier (Quinton A-100, petroleum resin, Nippon Zeon K.K.) | 5 parts |
| Short fibers (cotton powder) | 2 parts |

A rubber compound having the following composition of which amounts are indicated by parts by weight was used as a compound to prepare a compression layer of belt.

| | |
|---|---|
| Ethylene-propylene-diene rubber[1] | 100 parts |
| HAF carbon (Mitsubishi Kagaku K.K.) | 70 parts |
| Paraffin oil (Sunflex 2280, Japan Sun Kagaku K.K.) | 20 parts |
| Vulcanizing agent (oil sulfur, Hosoi Kagaku K.K.) | 1.6 parts |
| Vulcanizing accelerator (EM-2[4], Sanshin Kagaku K.K.) | 2.8 parts |
| Vulcanizing accelerator (MSA[5], Ouchi Shinko Kagaku K.K.) | 1.2 parts |
| Accelerator activator (stearic acid, Kao K.K.) | 1 part |
| Accelerator activator (zinc oxide, Sakai Kagaku Kogyo K.K.) | 5 parts |
| Antioxidant (224[2], Ouchi Shinko Kagaku K.K.) | 2 parts |
| Antioxidant (MB[6], Ouchi Shinko Kagaku K.K.) | 1 part |
| Short fibers (66 nylon fibers, 6 de × 1 mm) | 22 parts |

Notes:
[1]Ethylene content: 56% by weight, propylene content: 36.1% by weight, ethylidene norbornene (ENB) content: 5.5% by weight, dicyclopentadiene (DCP) content: 2.4% by weight, Mooney viscosity $ML_{1+4}$ (100° C.): 60
[2]TMDQ (2,2,4-trimethyl-1,2-dihydroquinoline)
[3]2-Mercaptobenzimidazole
[4]Mixture of accelerator activators
[5]N-Oxydiethylene-2-benzothiadisulfenamide
[6]2-Mercaptobenzimidazole Example 1
(Preparation of RFL Adhesive Composition C)

7.31 parts by weight of resorcin and 10.77 parts by weight of formalin (having a concentration of 37% by weight) were mixed together. An aqueous solution of sodium hydroxide (containing 0.33 parts by weight of sodium hydroxide) was added to the resulting mixture and stirred. Thereafter 160.91 parts by weight of water were added and the mixture was aged for 5 hours to provide an aqueous solution of resorcin-formalin resin (resorcin-formalin primary condensate, or RF resin) having a solid content of 6.40% by weight.

Then, as shown in Table 1, a chlorosulfonated polyethylene rubber (CSM) latex was added to the aqueous RF solution and the resulting mixture was aged for 12 hours to provide a resorcin-formalin-latex (RFL) adhesive composition C having the composition as shown in Table 1.
(Preparation of Adherend of Aramid Fiber Cords and Adhesive Rubber Layer and Measurement of its Adhesive Strength)

Aramid fiber cords (1000 de/1×3, having a first twisting coefficient of 859.9 and a final twisting coefficient of 863.3, Technola T-200 available from Teijin K. K.) prepared by first twisting of filaments and final twisting of the resulting strands were dipped in a toluene solution of isocyanate (having a solid content of 16% by weight of polymethylene polyphenyl polyisocyanate) and heated and dried at a temperature of 250° C. for 40 seconds to effect pretreatment of aramid fiber cords.

The thus pretreated aramid fiber cords were first dipped in a first RFL adhesive composition C having the composition as shown in Table 2 and heated and dried at a temperature of 250° C. for 80 seconds to effect the first RFL treatment. The aramid fiber cords were then dipped in a second RFL adhesive composition C (the same as the first RFL adhesive composition C) and heated and dried at a temperature of 250° C. for 80 seconds to effect the second (final) RFL treatment.

The aramid fiber cords were then dipped in an adhesive solution (rubber cement) prepared by dissolving the same ethylene-propylene-diene rubber compound as that used to prepare the adhesive rubber layer and was heated and dried at a temperature of 60° C. for 40 seconds thereby to effect post-treatment of the aramid fiber cords.

The aramid fiber cords thus treated were placed between a couple of sheets of unvulcanized ethylene-propylene-diene rubber compound which are to form an adhesive rubber layer, press-vulcanized at a temperature of 160° C. and under a face pressure of 3920 kPa for 35 minutes. The adhesive strength between the aramid fiber cords and the adhesive layer was measured and the manner of destruction in the adherend was observed. The results are shown in Table 2.
(Manufacturing of Power Transmission Belt and Evaluation of Dynamic Life Thereof)

In the same manner as described before, a sheet of rubberized canvas and a first sheet of unvulcanized ethylene-α-olefin-diene rubber compound to form an adhesive rubber layer were wound on the smooth surface of a molding cylinder, and then aramid fiber cords were wound spirally thereon. A second sheet of unvulcanized ethylene-α-olefin-dien rubber compound to form an adhesive rubber layer jointly with the first unvulcanized rubber sheet is further wound on the aramid fiber cords to place the aramid fiber cords between the first and second unvulcanized rubber sheets. A sheet of unvulcanized ethylene-α-olefin-dien rubber compound which was to form a compression layer was then wound on the second unvulcanized rubber sheet to form a laminate.

The laminate was then heated at a temperature of 165° C. and an inner pressure of 6 kgf/cm² and an outer pressure of 9 kgf/cm² for 35 minutes, and steam-vulcanized, thereby providing an annular product. The annular product was installed on a first driving system comprised of a driving roll and a driven roll and was driven to run under a predetermined tension while a plurality of ribs were formed on the surface of the laminate by using a suitable grinding wheel. The annular product having the ribs thereon was then installed on a second driving system and was driven to run while it was cut in annular slices of a predetermined width thereby providing V-ribbed belts having three ribs and a length of 1000 mm.

Figure 3:
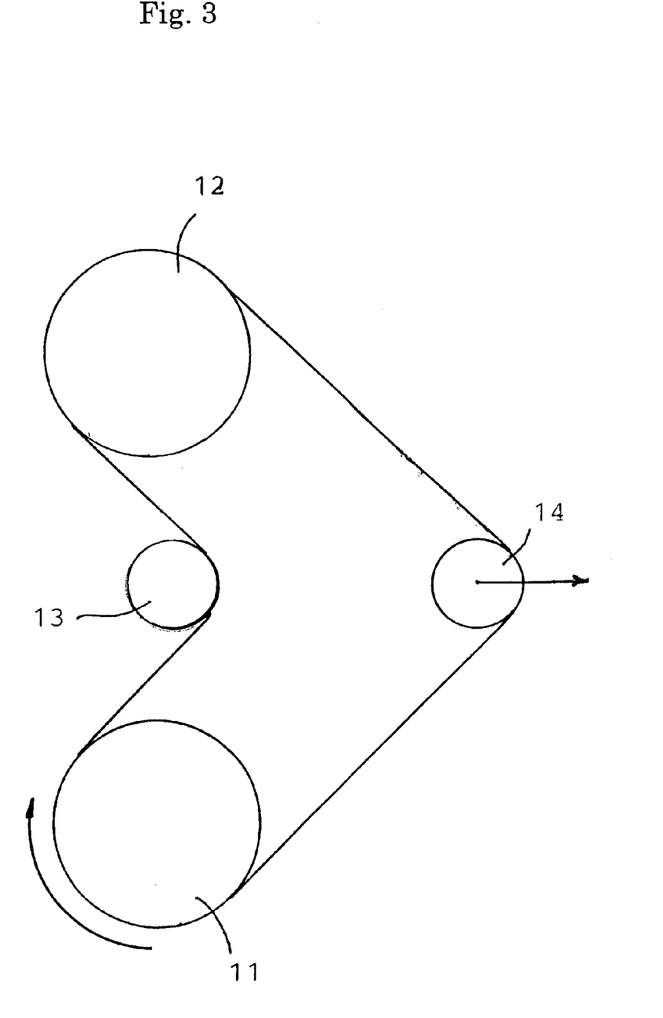
FIG. 3 shows a belt driving system to carry out a dynamic test of power transmission belts.

The V-ribbed belt was installed on a belt driving system comprised of a drive pulley 11 (having a diameter of 120 mm), a driven pulley 12 (having a diameter of 120 mm), an idler pulley 13 (having a diameter of 70 mm) and a tension pulley 14 (having a diameter of 55 mm) with the latter two being placed between the drive pulley and the driven pulley, as shown in FIG. 3. The belt was engaged with the idler pulley at its back. Under an ambient temperature of 110° C., the drive pulley was driven to rotate at 4900 rpm with a load of 16 h.p. on the driven pulley. A tension of 85 kgf was initially applied to the belt with the tension pulley. The time (hours) until the fiber cords were exposed or cracks were generated in the rubber layer was measured and taken as the dynamic life of the belt. The results are shown in Table 2.

Example 2

A chlorosulfonated polyethylene rubber (CSM) latex and a latex of a copolymer of 2-chloro-1,3-butadiene and 2,3-dichloro-1,3-butadiene (DCB) were added to the same RF solution as used in Example 1 and aged for 12 hours to prepare a resorcin-formalin-latex (RFL) adhesive composition D having the composition as shown in Table 1.

The same aramid fiber cords as used in Example 1 were dipped in the same toluene solution of isocyanate as that used in Example 1 and heated and dried at a temperature of 250° C. for 40 seconds to effect pretreatment of aramid fiber cords.

The thus pretreated aramid fiber cords were first dipped in a first RFL adhesive composition D having the composition as shown in Table 2 and heated and dried at a temperature of 250° C. for 80 seconds to effect the first RFL treatment. The aramid fiber cords were then dipped in a second RFL adhesive composition D (the same as above) and heated and dried at a temperature of 250° C. for 80 seconds to effect the second (final) RFL treatment.

The aramid fiber cords were then dipped in an adhesive solution (rubber cement) prepared by dissolving the same ethylene-propylene-diene rubber compound as that used to prepare the adhesive layer and was heated and dried at a temperature of 60° C. for 40 seconds thereby to effect post-treatment of the aramid fiber cords.

The aramid fiber cords thus treated were placed between a pair of sheets of unvulcanized ethylene-propylene-diene rubber compound which were to form an adhesive rubber layer and vulcanized in the same manner as in Example 1. The adhesive strength between the aramid fiber cords and the adhesive layer of the resulting adherend were measured. A V-ribbed belt was manufactured in the same manner as in Example 1 and its dynamic life was measured. The results are shown in Table 2.

Comparative Example 1

A styrene-butadiene-vinylpyridine copolymer (VP) latex was added to the same RF solution as that used in Example 1 and then aged for 12 hours to prepare a resorcin-formalin-latex (RFL) adhesive composition A having the composition as shown in Table 1.

The same aramid fiber cords as used in Example 1 were dipped in the same toluene solution of isocyanate as that used in Example 1 and heated and dried at a temperature of 250° C. for 40 seconds to effect pretreatment of aramid fiber cords. The thus pretreated aramid fiber cords were first dipped in a first RFL adhesive composition A having the composition as shown in Table 2 and heated and dried at a temperature of 250° C. for 80 seconds to effect the first RFL treatment. The aramid fiber cords were then dipped in a second RFL adhesive composition A (the same as above) and heated and dried at a temperature of 250° C. for 80 seconds to effect the second (final) RFL treatment.

The aramid fiber cords were then dipped in an adhesive solution (rubber cement) prepared by dissolving the same ethylene-propylene-diene rubber compound as used to prepare the adhesive rubber layer and was heated and dried at a temperature of 60° C. for 40 seconds thereby to effect post-treatment of the aramid fiber cords.

The aramid fiber cords thus treated were placed between a pair of sheets of unvulcanized ethylene-propylene-diene rubber compound which were to form an adhesive rubber layer and vulcanized in the same manner as in Example 1.

The adhesive strength between the aramid fiber cords and the adhesive layer of the resulting adherend was measured. A V-ribbed belt was manufactured in the same manner as in Example 1 and its dynamic life was measured. The results are shown in Table 2.

Comparative Example 2

A chloroprene rubber (CR) latex was added to the same RF solution as used in Example 1 and aged for 12 hours to prepare a resorcin-formalin-latex (RFL) adhesive composition B having the composition as shown in Table 1. The same aramid fiber cords as used in Example 1 were dipped in the same toluene solution of isocyanate as that used in Example 1 and heated and dried at a temperature of 250° C. for 40 seconds to effect pretreatment of aramid fiber cords.

The thus pretreated aramid fiber cords were first dipped in a first RFL adhesive composition B having the composition as shown in Table 2 and heated and dried at a temperature of 250° C. for 80 seconds to effect the first RFL treatment. The aramid fiber cords were then dipped in a second RFL adhesive composition B (the same as above) and heated and dried at a temperature of 250° C. for 80 seconds. The aramid fiber cords were then dipped in an adhesive solution (rubber cement) prepared by dissolving the same ethylene-propylene-diene rubber compound as used to prepare the adhesive rubber layer and was heated and dried at a temperature of 60° C. for 40 seconds thereby to effect post-treatment of the aramid fiber cords.

The aramid fiber cords thus treated were placed between a pair of sheets of unvulcanized ethylene-propylene-diene rubber compound which were to form an adhesive rubber layer and vulcanized in the same manner as in Example 1.

The adhesive strength between the aramid fiber cords and the adhesive layer of the resulting adherend was measured. A V-ribbed belt was manufactured in the same manner as in Example 1 and its dynamic life was measured. The results are shown in Table 2.

TABLE 1

| Composition of RFL | RFL | | | |
|---|---|---|---|---|
| (parts by weight) | A | B | C | D |
| RFL | 74.40 | 74.40 | 74.40 | 62.25 |
| RF solution (solid content) | 1.39 | 1.39 | 1.39 | 1.39 |
| VP[1] (solid content) | 13.49 | — | — | — |
| CR[2] (solid content) | — | 13.49 | — | — |
| CSM[3] (solid content) | — | — | 13.49 | 6.74 |

TABLE 1-continued

| Composition of RFL | RFL | | | |
|---|---|---|---|---|
| (parts by weight) | A | B | C | D |
| DCB[4] (solid content) | — | — | — | 4.32 |
| Solid content of RFL (% by weight) | 20 | 20 | 20 | 20 |

(Notes)
[1] Vinylpyridine latex (solid content: 40% by weight) available from Nihon Gosei Gomu K.K.
[2] Chloroprene rubber latex (solid content: 50% by weight) available from Showa Denko K.K.
[3] Chlorosulfonated polyethylene latex (solid content: 40% by weight) available from Sumitomo Seika K.K.
[4] Latex of copolymer of 2-chloro-1,3-butadiene and 2,3-dichloro-1,3-butadiene (solid content: 32% by weight) available from Toso K.K.

TABLE 2

|  | Comparative Examples | | Examples | |
|---|---|---|---|---|
|  | 1 | 2 | 1 | 2 |
| RFL used in the first treatment | A | B | C | D |
| RFL used in the second treatment | A | B | C | D |
| Adhesion strength of fiber cords (N/3 cords) | 5.0 | 3.0 | 63 | 68 |
| Dynamic life of belt (hours) | 1.5 | 0.5 | 111 | 117 |
| Manner of belt destruction | a) | a) | b) | b) |

(Notes)
a) Fiber cords exposed
b) Rubber layer cracked

Examples 3–8

A CSM latex (and a DCB latex) were added to the same solution of RF resin as that used in Example 1 together with an aqueous dispersion of vulcanization accelerator DM (dibenzothiazyl disulfide) and zinc oxide and aged for 12 hours to prepare a resorcin-formalin-latex (RFL) adhesive compositions E to J each having the composition as shown in Table 3.

The same aramid fiber cords as that used in Example 1 were dipped in the same toluene solution of isocyanate as that used in Example 1 and heated and dried at a temperature of 250° C. for 40 seconds to effect pretreatment of aramid fiber cords.

The thus pretreated aramid fiber cords were first dipped in a first RFL adhesive composition having the composition as shown in Table 4 and heated and dried at a temperature of 250° C. for 80 seconds to effect the first RFL treatment. The aramid fiber cords were then dipped in a second RFL adhesive composition having the composition as shown in Table 4 and heated and dried at a temperature of 250° C. for 80 seconds to effect the second (final) RFL treatment.

The aramid fiber cords were then dipped in an adhesive solution (rubber cement) prepared by dissolving the same ethylene-propylene-diene rubber compound as that used to prepare the adhesive rubber layer and was heated and dried at a temperature of 60° C. for 40 seconds thereby to effect post-treatment of the aramid fiber cords.

The aramid fiber cords thus treated were placed between a pair of sheets of unvulcanized ethylene-propylene-diene rubber compound which were to form an adhesive rubber layer and vulcanized in the same manner as in Example 1. The adhesive strength between the aramid fiber cords and the adhesive layer of the resulting adherend was measured.

V-ribbed belts were manufactured using each of the resulting adherends in the same manner as in Example 1 and their dynamic life was measured. As the results are shown in Table 4, all the belts were destroyed as the results of generation of crack in the rubber layer

TABLE 3

| Composition of RFL | RFL | | | | | |
|---|---|---|---|---|---|---|
| (parts by weight) | E | F | G | H | I | J |
| RFL | 89.11 | 82.89 | 75.00 | 74.44 | 69.26 | 62.75 |
| RF solution (solid content) | 1.39 | 1.39 | 1.39 | 1.39 | 1.39 | 1.39 |
| CSM latex (solid content) | 13.49 | 13.49 | 13.49 | 6.74 | 6.74 | 6.74 |
| DCB latex (solid content) | — | — | — | 4.32 | 4.32 | 4.32 |
| DM/ZnO[5] solid content) | 1.16 | 0.87 | 0.12 | 0.95 | 0.71 | 0.10 |
| Solid content of RFL (% by weight) | 18 | 19 | 20 | 18 | 19 | 20 |

(Notes)
[5] Aqueous dispersion of mixture of vulcanization accelerator DM and zinc oxide in a weight ratio of 5/1 (solid content of 43% by weight)

TABLE 4

|  | Examples | | | | | |
|---|---|---|---|---|---|---|
|  | 3 | 4 | 5 | 6 | 7 | 8 |
| RFL used in the first treatment | E | F | G | E | F | G |
| RFL used in the second treatment | E | F | G | E | I | J |
| Adhesion strength of fiber cords (N/3 cords) | 66 | 62 | 63 | 62 | 65 | 62 |
| Dynamic life of belt (hours) | 300 | 314 | 270 | 305 | 330 | 272 |

Examples 9–12 and Comparative Example 3 and 4

Aramid fiber cords (1000 de/1×3, Technola T-200 available from Teijin K. K.) prepared by first twisting of filaments and final twisting of the resulting strands and having a first twisting coefficient and a final twisting coefficient as listed in Table 5 were dipped in the same toluene solution of isocyanate as that used in Example 1 and heated and dried at a temperature of 250° C. for 40 seconds to effect pretreatment of aramid fiber cords.

The thus pretreated aramid fiber cords were then subjected to first and final RFL treatment using an RFL adhesive composition D as shown in Table 5, and were heated and dried at a temperature of 250° C. for 80 seconds. The aramid fiber cords thus treated were then dipped in an adhesive solution (rubber cement) prepared by dissolving the same ethylene-propylene-diene rubber compound as that used to prepare the adhesive layer and was heated and dried at a temperature of 60° C. for 40 seconds thereby to effect adhesion-treatment of the aramid fiber cords.

The aramid fiber cords thus treated were placed between a pair of sheets of unvulcanized ethylene-propylene-diene rubber compound which were to form an adhesive rubber layer and vulcanized in the same manner as in Example 1. The adhesive strength between the aramid fiber cords and the adhesive layer of the resulting adherend was measured.

V-ribbed belts were manufactured using each of the resulting adherends in the same manner as in Example 1 and their dynamic life was measured. The results are shown in Table 5.

TABLE 5

|  | Examples | | | | Comparative Examples | |
| --- | --- | --- | --- | --- | --- | --- |
|  | 9 | 10 | 11 | 12 | 3 | 4 |
| First twisting number (T/10 cm) | 11.8 | 14.4 | 15.7 | 17.0 | 9.2 | 18.4 |
| First twisting coefficient | 646.3 | 788.7 | 859.9 | 931.1 | 503.9 | 1007.8 |
| Final twisting number (T/10 cm) | 20.4 | 25.0 | 27.3 | 29.5 | 15.9 | 32.0 |
| Final twisting coefficient | 645.1 | 790.6 | 863.3 | 932.9 | 502.8 | 1011.9 |
| Adhesion strength of fiber cords (N/3 cords) | 65 | 64 | 66 | 64 | 63 | 63 |
| Dynamic life of belt (hours) | 184 | 205 | 260 | 211 | 91 | 135 |
| Belt strength/3 ribs (kN) | 8.7 | 8.5 | 8.5 | 8.4 | 8.9 | 7.9 |

As seen in Comparative Example 3, the use of aramid fiber cords having a first twisting coefficient and a final twisting coefficient both less than 650 provides a belt having a high strength, but poor durability. On the other hand, as seen in Comparative Example 4, the use of aramid fiber cords having a first twisting coefficient and a final twisting coefficient both more than 950 provides a belt having a relatively good durability but a poor strength. When aramid fiber cords having a first twisting coefficient and a final twisting coefficient both much more than those used in Comparative Example 4, the resulting belt is insufficient in durability as well as in strength. However, according to the invention, the use of aramid fiber cords having a first twisting coefficient and a final twisting coefficient both in the range from 650 to 950 provides a belt which is excellent both in durability and strength.

What is claimed is:

1. A power transmission belt which comprises a compression layer and an adhesive rubber layer which are adhered to each other by vulcanizing together and which has aramid fiber cords embedded in the adhesive rubber layer, wherein the compression layer and the adhesive rubber layer are formed of vulcanizate of an ethylene-α-olefin-diene rubber compound and wherein the aramid fiber cords having a first twisting coefficient and a final twisting coefficient both in the range from 650 to 950 are adhesion treated with a resorcin-formalin-latex adhesive composition wherein the resorcin-formalin-latex latex comprises at least one of chlorosulfonated polyethylene and alkylated chlorosulfonated polyethylene in an amount of 50–100% by weight based on the solid components of the latex and adhered to and embedded in the adhesive rubber layer.

2. The power transmission belt as claimed in claim 1 wherein the resorcin-formalin-latex comprises at least one of chlorosulfonated polyethylene and alkylated chlorosulfonated polyethylene in an amount of not less than 50% by weight based on the solid components of the latex and a copolymer of 2-chloro-1,3-butadiene and 2,3-dichloro-1,3-butadiene in an amount of not more than 50% by weight based on the solid components of the latex.

3. The power transmission belt as claimed in claim 1 wherein the ethylene-α-olefin-diene rubber is a copolymer rubber formed of ethylene and at least one α-olefins selected from the group consisting of propylene, butene, hexene and octene.

4. The power transmission belt as claimed in claim 1 wherein the resorcin-formalin-latex adhesive composition contains 0.5–10 parts by weight of at least one metal oxides and 0.1–20 parts by weight of at least one vulcanization accelerators relative to 100 parts by weight of the solid components of the latex.

5. The power transmission belt as claimed in claim 4 wherein the metal oxide is at least one of zinc oxide, magnesium oxide and lead oxide.

6. The power transmission belt as claimed in claim 4 wherein the vulcanization accelerator is at least one of thiazoles, sulfenamides, thiurams and dithiocarbamates.

7. A process for production of a power transmission belt which comprises a compression layer and an adhesive rubber layer which are adhered to each other by vulcanizing together and which has aramid fiber cords embedded in the adhesive rubber layer, which comprises:

carrying out adhesion treatment of the aramid fiber cords having a first twisting coefficient and a final twisting coefficient both in the range from 650 to 950, wherein the adhesion treatment comprises impregnating the aramid fiber cords with a resorcin-formalin-latex adhesive composition wherein the latex contains at least one of chlorosulfonated polyethylene and alkylated chlorosulfonated polyethylene in an amount of 50–100% by weight based on the solid components of the latex as well as at least one metal oxides and at least one sulfur containing vulcanization accelerators, and heating and drying the resulting polyester fiber cords at a temperature of 210–260° C.;

placing the resulting aramid fiber cords between a pair of sheets formed of unvalcanized ethylene-α-olefin-diene rubber compound which are to form an adhesive rubber layer;

laminating the said pair of sheets formed of unvalcanized ethylene-α-olefin-diene rubber compound on a sheet formed of unvalcanized ethylene-α-olefin-diene rubber compound which is to form a compression layer; and heating the resulting laminate under pressure to vulcanize the laminate in a body to provide the belt wherein the aramid fiber cords are adhered to and embedded in the adhesive rubber layer.

8. The process as claimed in claim 7 wherein the latex comprises at least one of chlorosulfonated polyethylene and alkylated chlorosulfonated polyethylene in an amount of not less than 50% by weight based on the solid components of the latex and a copolymer of 2-chloro-1,3-butadiene and 2,3-dichloro-1,3-butadiene in an amount of not more than 50% by weight based on the solid components of the latex.

9. The process as claimed in claim 7 wherein the ethylene-α-olefin-diene rubber is a copolymer rubber formed of ethylene and at least one α-olefins selected from the group consisting of propylene, butene, hexene and octene.

10. The process as claimed in claim 7 wherein the resorcin-formalin-latex adhesive composition contains 0.5–10 parts by weight of at least one metal oxides and 0.1–20 parts by weight of at least one vulcanization accelerators relative to 100 parts by weight of the solid components of the latex.

11. The process as claimed in claim 7 or 10 wherein the metal oxide is at least one of zinc oxide, magnesium oxide and lead oxide.

12. The process as claimed in claim 7 or 10 wherein the vulcanization accelerator is at least one of thiazoles, sulfenamides, thiurams and dithiocarbamates.

* * * * *